(12) United States Patent
Talbot et al.

(10) Patent No.: US 11,684,012 B2
(45) Date of Patent: Jun. 27, 2023

(54) DRAPER CANVAS SEAL

(71) Applicant: MacDon Industries LTD, Winnipeg (CA)

(72) Inventors: Francois R Talbot, Winnipeg (CA); Romain Etienne Guy Coudiere, Winnipeg (CA)

(73) Assignee: MacDon Industries LTD, Winnipeg (CA)

( * ) Notice: Subject to any disclaimer, the term of this patent is extended or adjusted under 35 U.S.C. 154(b) by 287 days.

(21) Appl. No.: 17/136,088

(22) Filed: Dec. 29, 2020

(65) Prior Publication Data

US 2021/0112718 A1  Apr. 22, 2021

Related U.S. Application Data

(62) Division of application No. 16/031,051, filed on Jul. 10, 2018, now Pat. No. 10,918,017.

(51) Int. Cl.
| | |
|---|---|
| *A01D 43/06* | (2006.01) |
| *A01D 34/14* | (2006.01) |
| *A01D 41/14* | (2006.01) |

(52) U.S. Cl.
CPC .......... *A01D 43/06* (2013.01); *A01D 34/14* (2013.01); *A01D 41/14* (2013.01)

(58) Field of Classification Search
CPC ........ A01D 43/06; A01D 34/14; A01D 41/14; A01D 57/20; A01D 47/00
See application file for complete search history.

(56) References Cited

U.S. PATENT DOCUMENTS

| | | | | |
|---|---|---|---|---|
| 1,917,604 | A * | 7/1933 | Scranton, Jr. .......... | A01D 34/13 56/298 |
| 5,459,986 | A * | 10/1995 | Talbot .................. | A01D 61/002 56/DIG. 17 |
| 6,351,931 | B1 * | 3/2002 | Shearer .................. | A01D 57/20 56/DIG. 17 |
| 7,412,816 | B2 * | 8/2008 | Coers ..................... | A01D 57/20 56/208 |
| 7,549,280 | B2 * | 6/2009 | Lovett .................. | A01D 61/002 56/208 |
| 7,600,364 | B2 * | 10/2009 | Lovett .................... | A01D 57/20 56/181 |
| 7,908,836 | B1 * | 3/2011 | Rayfield ................ | A01D 57/20 56/181 |
| 7,958,711 | B1 * | 6/2011 | Sauerwein ............ | A01D 57/20 56/181 |
| 8,006,831 | B1 * | 8/2011 | Mackin .................. | B65G 21/14 198/860.1 |

(Continued)

*Primary Examiner* — Arpad F Kovacs
(74) *Attorney, Agent, or Firm* — Miller Canfield (57) ABSTRACT

A crop harvesting header with a cutter bar and a draper assembly has a draper which includes a front edge of the upper run of the draper arranged at a position adjacent to but spaced from the cutter bar and there is provided a sealing member extending along the cutter bar. The sealing member is includes a bracket and a strip of flexible material where the bracket does not include any rearwardly extending biasing portion and the strip, when free from loading forces, contains a distortion from a flat form so that the second edge portion is distorted from a plane of the first edge portion in a direction toward the edge portion of the upper run.

14 Claims, 5 Drawing Sheets

(56) References Cited

U.S. PATENT DOCUMENTS

| | | | | |
|---|---|---|---|---|
| 8,291,686 B1* | 10/2012 | Cormier | ............... | A01D 61/002 |
| | | | | 56/181 |
| 8,322,520 B2* | 12/2012 | Dow | ................... | A01D 61/002 |
| | | | | 56/181 |
| 8,484,939 B1* | 7/2013 | Cormier | ................ | A01D 41/14 |
| | | | | 56/181 |
| 8,511,050 B1* | 8/2013 | Cormier | ............... | A01D 61/002 |
| | | | | 56/181 |
| 9,271,443 B2* | 3/2016 | Sethi | ...................... | A01D 57/00 |
| 9,338,941 B2* | 5/2016 | Herringshaw | ......... | A01D 34/40 |
| 2011/0154794 A1* | 6/2011 | Goers | ................ | A01D 61/002 |
| | | | | 56/181 |
| 2012/0216500 A1* | 8/2012 | Sauerwein | ........... | A01D 61/002 |
| | | | | 56/181 |
| 2013/0160417 A1* | 6/2013 | Huseman | ............... | A01D 41/14 |
| | | | | 56/181 |
| 2014/0059995 A1* | 3/2014 | Cormier | ................ | A01D 43/06 |
| | | | | 56/181 |
| 2014/0165526 A1* | 6/2014 | Leys | ...................... | A01D 41/14 |
| | | | | 56/181 |
| 2014/0196427 A1* | 7/2014 | Fuechtling | ........... | A01D 61/002 |
| | | | | 56/181 |
| 2016/0316620 A1* | 11/2016 | Allochis | ................ | A01D 34/04 |
| 2019/0350133 A1* | 11/2019 | Batu | .................... | A01D 61/002 |

\* cited by examiner

DRAPER CANVAS SEAL

CROSS REFERENCE TO RELATED APPLICATION

This application is a divisional application of U.S. patent application Ser. No. 16/031,051, filed Jul. 10, 2018.

This invention relates to a crop header arranged for cutting and transporting a standing crop and particularly to a sealing device for providing a seal between a fixed member and a moving edge of a draper canvas of the header.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper forming a continuous loop of flexible material wrapped around the rollers so as to define a front edge of the draper adjacent the cutter bar, a rear edge of the draper spaced rearwardly of the cutter bar, an upper run of the draper on top of the roller and a lower run of the draper below the rollers. The cut crop thus falls rearwardly onto the upper run of the draper and is transported longitudinally of the header. Between the two end draper rollers there is provided a support plate assembly for supporting the upper run of the draper to prevent sagging.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper normally comprises a fabric which is coated with a rubber material which is then vulcanized after forming of the fabric into the required shape and after attachment thereto of transverse slats.

The arrangement shown in U.S. Pat. No. 5,459,986 (Talbot) issued Oct. 24, 1995 and assigned to the present Assignees has achieved significant success and has been used for many years. It provides a seal between an under surface of a rearwardly extending element of the cutter bar and a front edge portion of the upper surface of the draper.

Not shown in the above patent is the conventional guiding arrangement to prevent misalignment of the draper on the rollers and this is provided by a bead located on the underside of the draper which runs in a groove in the roller. In U.S. Pat. No. 8,484,939 (Cormier) issued Jun. 16, 2013 by the present applicants is shown a further design of sealing arrangement which includes an integrally extruded strip which defines a bracket portion which bolts onto the cutter bar and a rearwardly extending blade portion which is carried by the bracket portion and overlies the edge of the draper canvas.

In U.S. Pat. No. 9,635,810 (Leys) issued May 2, 2017 by Honey Bee Manufacturing discloses a further design of seal using a flat strip of draper material which is clamped onto the cutter bar by a bracket which includes a rearwardly extending portion which engages the flat strip and applies a biasing fore to the flat strip to push it downwardly onto the edge of the draper canvas.

The disclosures of the above patents are incorporated herein by reference or may be referred to for details of the construction not provided herein.

SUMMARY OF THE INVENTION

According to the invention there is provided a crop header arranged for cutting and transporting a standing crop comprising:

a draper assembly arranged such that cut crop falls onto the draper assembly for transportation relative to the header;

the draper assembly including a draper guide roller and a continuous loop of belt material wrapped defining an upper run of the belt material on top of the roller and a lower run of the belt material below the roller, wherein the belt material includes an edge portion of the upper run of the belt material;

a support wall of the header adjacent to and spaced from the edge portion of the belt material;

and a sealing member attached to the support wall for spanning and sealing between the edge portion and the support wall;

wherein the sealing member comprises a strip of a flexible material which extends from a first edge portion of the strip at the support wall to a second edge portion of the strip which lies over and in contact with the edge portion of the upper run and a bracket which clamps the first edge portion to the support wall;

wherein the strip, when free from loading forces, contains a distortion from a flat form so that the second edge portion is distorted from a plane of the first edge portion in a direction toward the edge portion of the upper run.

Typically the support wall is defined by an upper wall of a cutter bar of the header which carries a cutting system and the sealing system operates to seal between the cutter bar and the draper front edge. However the same sealing system can be used in other locations in a crop header to seal between the edge of a draper canvas and other adjacent fixed members relative to which the draper canvas moves.

It will be appreciated that the term "draper canvas" is a traditional term based upon the canvas material from which the "draper" was made but that this term no longer provides any indication of nor limitation to the use of particular materials for the base fabric from which the "draper" is made. Many synthetic materials can thus be used. Commonly the draper is coated with a rubber layer and again many different resilient coating materials can be used and no limitation is intended herein in this regard. The increased thickness at the edge portion described above can be made of the same material as the remaining rubber covering or may be a strip of a different material of different chemical structure or of different characteristics.

While the knife used with the cutter bar is usually of the sickle knife type including a plurality of knife guards mounted on the cutter bar, other types of knife can also be used.

BRIEF DESCRIPTION OF THE DRAWINGS

In the drawings like characters of reference indicate corresponding parts in the different figures.

DETAILED DESCRIPTION

The following description relates only those parts of the header which are of importance to the present invention and the remaining parts of the header including the frame structure, drives, ground wheels and the like are omitted as these will be well known to one skilled in the art or shown in detail for example in the above cited U.S. Pat. No. 8,484,939 (Cormier) issued Jun. 16, 2013 by the present applicants.

The header therefore comprises a frame, one element 10 of which is in the form of a beam extending horizontally and forwardly from a rear support frame structure 10 to a cutter bar assembly generally indicated at 11 for support of that cutter bar assembly across the front of the header. The beam 10 forms a single beam or one of a plurality of such beams arranged at spaced positions along the length of the header frame so as to support the cutter bar assembly 11 as an elongate structure across the front edge of the header.

One example of the cutter bar comprises a generally Y-shaped beam 12 with a leg 12C and two arms 12D and 12E. However many other designs of cutter bar are possible.

The beam is formed from two components 12A and 12B welded together at the leg 12C, where the leg provides structural support for the cutter bar elements including the guards and sickle bar which are omitted from the drawings. The knife guards are of course of well-known construction and carry a sickle knife assembly having a longitudinally reciprocating bar driving a plurality of triangular knife blades which sit on the knife guards and reciprocate back and forth across the knife guards in a cutting action.

The leg 12E of the cutter bar support beam 12 includes a portion 12F extending upwardly and rearwardly from the flange 12C to an upper generally rearwardly extending top wall 12G which extends to a rear apex 12K. At the apex the top wall 12G connects with an L-shaped hanger portion 12H including a vertical extending plate 12L and a forwardly extending generally horizontal flange 12J projecting toward but not meeting the wall 12F.

The leg 12D forms a rearwardly and downwardly extending wall which acts as a skid plate when the cutter bar is cutting on the ground. The plate 12D may be covered by a protective plastics wear shield (not shown).

The draper assembly generally indicated at 13 includes a first draper support roller 13A and a second draper support roller (not visible). One of these rollers is driven by a drive motor to effect rotation of the draper in conventional manner. The draper assembly 13 further includes a draper 13B in the form of a continuous loop or band of fabric 13C which is wrapped around the rollers at respective ends to form an upper run 13D of the draper on top of the rollers and a lower run 13E of the draper underneath the rollers. The rollers are thus spaced longitudinally of the cutter bar and arranged with their axes of rotation parallel and at right angles to the cutter bar. The draper 13C has an inner drive surface 13G engaging an outer surface of the rollers 13D. The draper thus includes a front edge 13H of the upper run which is adjacent the cutter bar and a rear edge (not visible) of the upper run 13D which is remote from the cutter bar and spaced rearwardly therefrom thus defining therebetween a flat surface of the upper run for transportation of the crop longitudinally of the header. The lower run 13E also includes a front edge 13J and a rear edge. The draper includes a plurality of conventional transverse slats 13K which assist in carrying the crop along the draper. Each edge of the draper can include a conventional folded seam so as to define a portion of the draper material which is folded back with that folded back portion being folded back on top of the fabric layer and bonded to the draper by the vulcanization effect in the manufacture of the draper. Alternatively a separate strip can be added.

The upper run of the draper is supported by a front plate assembly 14 which includes a horizontal top plate portion 14A laying underneath the upper run of the draper adjacent the front edge 13H for supporting that front edge in sliding movement across the top surface of that plate. The support plate 14 is carried on a cross channel defined by the plate portion 14A which forms the upper plate of a C-shaped channel member 14B including vertical wall 14C and bottom wall 14D. This is attached to a suitable support component of the frame as shown in more detail in the above patent.

The front edge 14A of the support plate 14 is spaced rearwardly from the front edge 13X of the upper run of the draper so that the forwardmost edge portion 13H of the draper is cantilevered forwardly from the front edge 14A. The front edge 14A of the support plate 14 is located adjacent but spaced rearwardly from the vertical plate 12H slightly below the apex 12K. Thus the upper run of the draper lies across the plate 14 and extends beyond the edge 14A to a position closely adjacent the apex 12K. The draper at the edge 13X includes a band of rubber or increased thickness relative to the main portion of the draper so as to provide a rubber wear strip 13Y with a flat upper surface parallel to the body of the draper along the edge. A guide bead 13Z is provided on the underside of the strip 13X to engage into grooves in the rollers.

In order to provide a seal between the front edge 13H of the draper and the upper leg 12E of the cutter bar 12, there is provided a sealing member 15 extending along the cutter bar 12 defining a bracket 15A attached to the cutter bar and a second strip portion 15B formed of a flexible material which extends rearwardly from the first portion at the cutter bar to lie over and in contact with the flat upper surface of the wear strip 13Y at the front edge portion 13H of the draper at the front edge 13X.

As described previously there is provided a support surface for engaging the draper rearwardly of the front edge in the event that the draper sags so that a front edge portion of the draper is cantilevered beyond the support surface so that the second portion contacts the draper at the cantilevered front edge portion defined by the bead.

This seal therefore inhibits the build-up of materials inside the cutter bar 12 and between the draper upper run and lower run and around the draper rollers which can of course cause damage.

At the rear edge, the draper is guided on the draper roller by a V groove in the roller into which projects from the back of the draper the V-shaped guide rib which runs along the inner surface of the draper along its full length. Thus the draper as shown is typically symmetrical which would allow the draper to be reversed by rotating the draper so that the front edge is turned to become the rear edge and vice versa.

The draper can be of the construction shown in the above patent of Talbot which includes a base layer or sheet which is formed of a fabric sheet which is folded at its edge or includes a separate added strip to form a portion which is double thickness at the end edge which lies on top of the fabric of the layer spaced away from the edge. The draper carries a coating or infused rubberized layer in a conventional manner. At the edge is provided the strip or bead of a resilient material. The resilient material is preferably of the same construction as the rubberized coating so that it can be vulcanized with the structure of the draper and molded in place as part of the manufacturing process. The strip has a front edge which is at or immediately adjacent the edge of the base layer of the draper. The strip has an upper surface which is flat and smooth. Thus the strip is rectangular with vertical side edges and the top surface horizontal. However the strip may be shaped with inclined or tapered side edges.

In the example shown the strip has the width of the order of 1" (25 mm) and a height of the order of ⅛" (4.0 mm). The strip thus stands up from the upper surface of the base layer of the draper that is the upper surface of the folded back portion.

The draper also carries slats which stand upwardly from the upper surface of the draper to a top edge which is at a height significantly greater than the height of the strip base layer of fabric and rubber forming the draper. Each slat extends transversely across the draper to a position closely adjacent the strip at the front edge of the draper. Thus each slat extends to an end edge which is spaced from the side edge. The slats are molded at the same time as the wear strip but do not touch the strip.

The presence of the edge wear strip provides an improved sealing effect between the wear strip and the surface 13Y and the strip portion 15B due to an increase in pressure therebetween. In addition the presence of a shoulder at the edge of the edge strip 13Y provides a raised surface standing upwardly from surface of the draper to inhibit the penetration of material into the space between the surfaces bead and the plate portion. The wear strip 13Y provides more wear life and also acts as a dam to block dirt from passing the seal.

Figure 1:
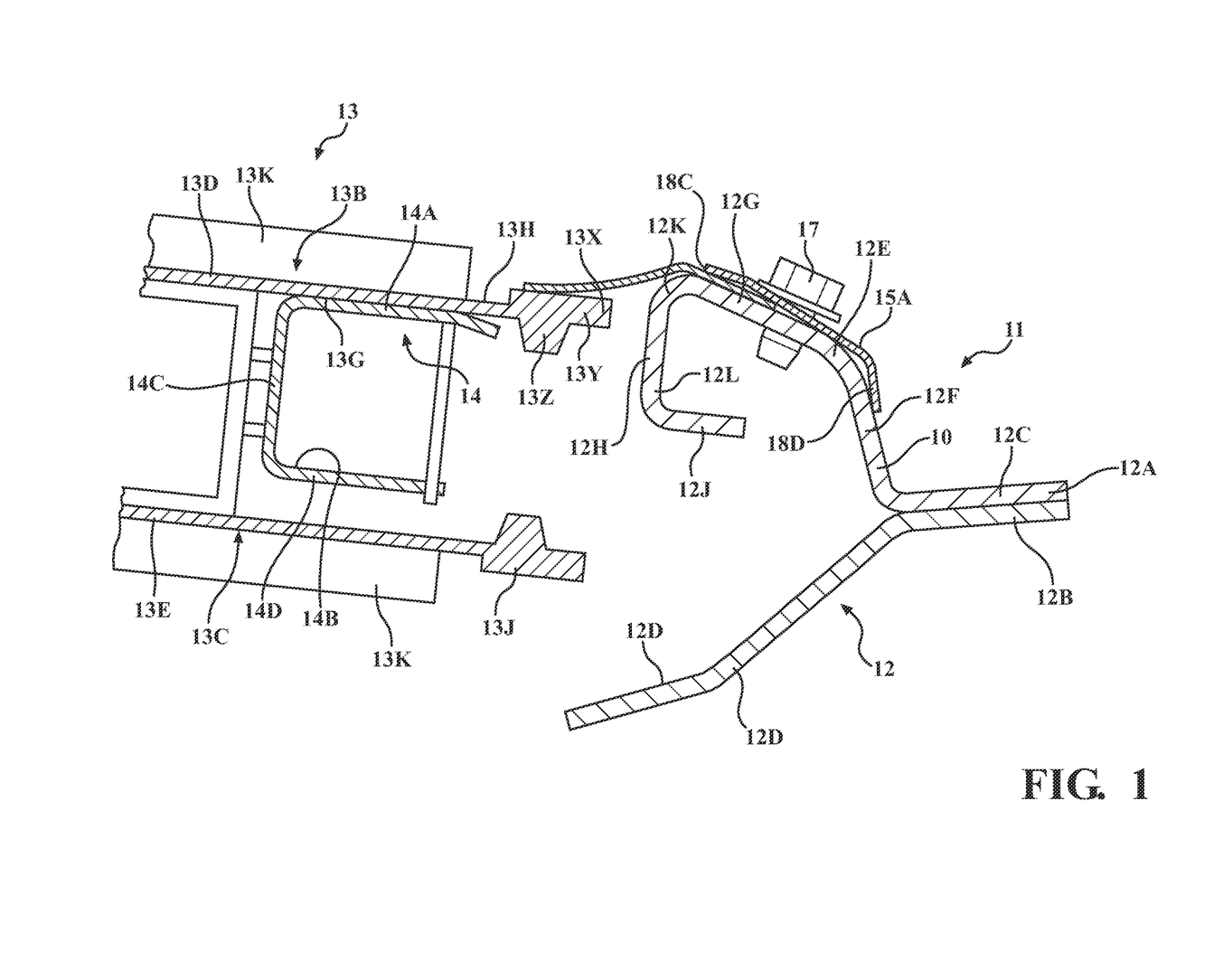
FIG. 1 is a cross sectional view showing the front part of the header and draper at the cutter bar of a first embodiment of a crop header according to the present invention where the strip is formed from a vulcanized fabric and rubber layer.
Figure 5:
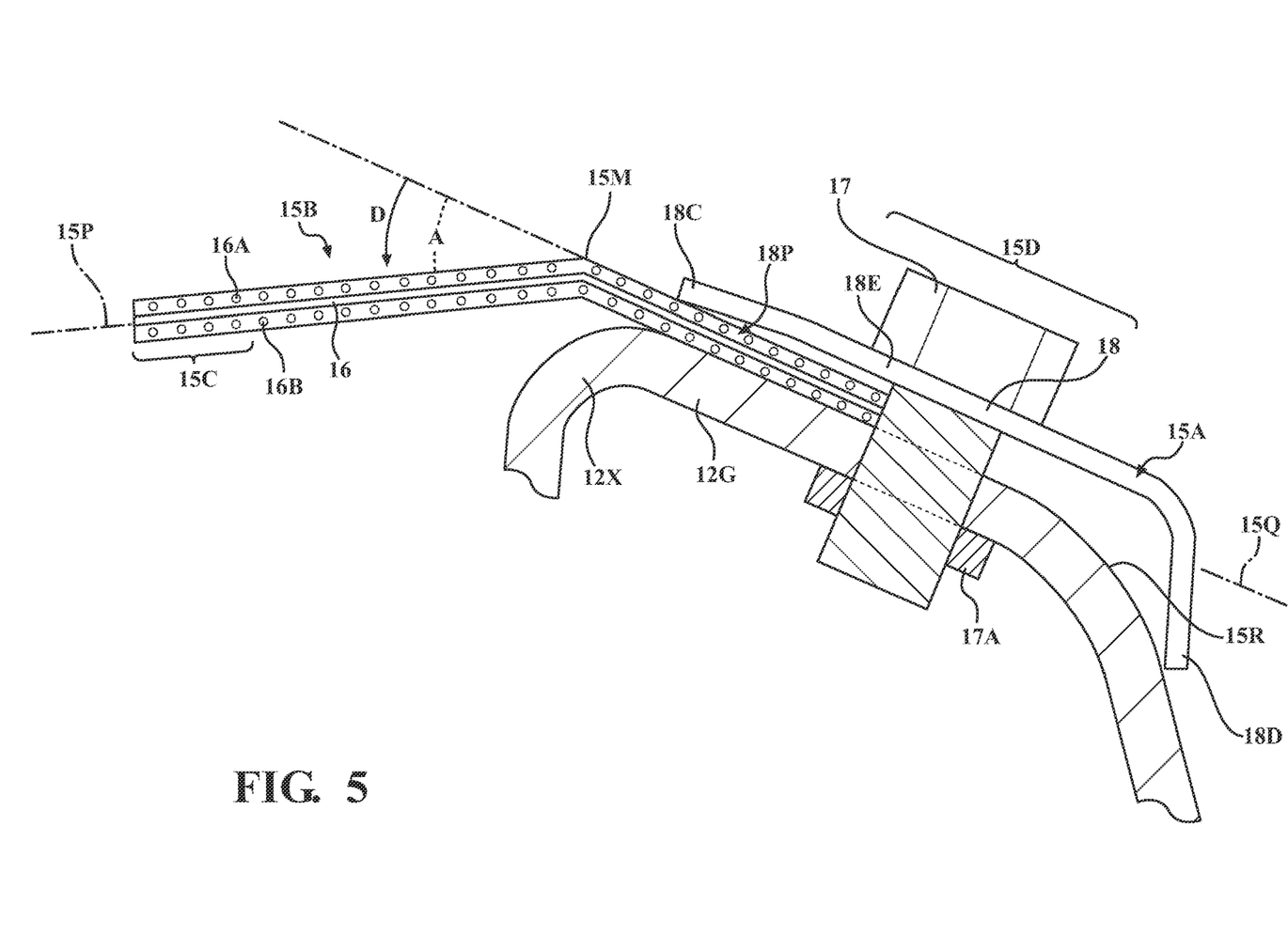
FIG. 5 is a cross sectional view showing the front part of the header and draper on an enlarged scale with the draper canvas or belt removed so that the strip is un-loaded by contact therewith.

Thus as shown in FIG. 1 and more clearly in the enlarged view of FIG. 5, the sealing member comprises the strip 15B of a flexible material which extends from a first edge portion 15D of the strip 15B at the support wall to a second edge portion 15C of the strip which lies over and in contact with the edge portion 13X of the upper run of the belt. The sealing member further includes the bracket 15A which clamps the first edge portion 15D to the support wall 12E of the bar 12.

As shown in FIG. 5, the strip is shown separate from the belt and free from contact with the belt so that the shape of the strip as shown is free from loading forces. Thus it can be seen that the strip contains a distortion from a flat form so that the second edge portion 15C is distorted relative to the first edge portion in a direction D toward the edge portion of the upper run. In this way, when under no loading from any contact, the plane of the portion 15C as shown at 15P is bent from the plane 15Q. Thus the strip includes a longitudinally extending bend line 15M at which the strip is bent at an angle A and the strip is substantially planar on both sides of the bend line 15M.

The angle A is in the range 30 to 60 degrees and preferably of the order of 45 degrees in the rest or unloaded position so that when loaded by contact on the belt, the angle is reduced to about 20 degrees by the upward force from the belt. This upward force causes a slight curvature in the portion of the strip on the side of the bend line adjacent the belt and applies forces into the structure of the strip where those forces are applied between the underside of the strip and the upper surface of the belt. These forces act to maintain a contact with the belt as the belt moves or sags. The distortion of the strip by the contact with the belt also allows it to move back toward the belt as the belt moves away from the strip on sagging or other movement.

In the arrangement of FIGS. 1 and 5, the strip is formed from materials used conventionally for a draper canvas including two upper and lower fabric layers 16A and 16B extending through the strip between the side edges and along the length and having a vulcanized coating central layer between the upper and lower fabric layers. Thus the strip can be formed with two layers of fabric at the top and bottom and an intervening layer of vulcanized rubber integrating the two fabric layers. The fabric layers act to reduce friction in engagement with rubber layer of the wear strip 13Y.

In this method of formation the strip has a constant thickness across its width. As set forth above, the strip includes a longitudinally extending bend line 15M at which the strip is bent at an angle formed by the vulcanized layer. That is during the vulcanization process the strip is maintained at the bend condition so that the vulcanized layer or layers, if more than one layer is used as an option, contain and maintain the bend line so that bending from the set bend angle requires elastic deformation of the rubber material. The formation of the bend line can also be carried out subsequent to vulcanization by application of heat and pressure to the previously formed strip.

As shown in FIG. 1, the bracket comprises a strip 18 of metal or other rigid material that has a generally flat body which is bolted to the support wall 12G by a series of bolts 17 along the bracket which engage into a threaded hole as shown in FIG. 1 or include a nut 17A underneath the wall 12G as shown in FIG. 5. The bracket 15B has a front edge 18D and a rear edge 18C. The rear edge 18C terminates on the support wall 12G so that the bracket includes no rearward extending portion extends beyond the apex 12K of the top support wall 12G. Thus the rear edge 18C acts to pinch the strip 15B onto the top surface of the wall 12G and provides no portion beyond the pinch line 18P. Thus there is no part of the bracket which acts to bias the strip 15B toward the upper run of the belt. Thus all of the biasing of the strip 15B occurs in the body of the strip itself and not by any effect of the bracket.

That is, the bracket does not bias the strip toward the belt since the bracket terminates at a pinch point on top of the support wall. Also at that point the strip is not directed to the belt but instead if it continues in a straight line from the pinch point as directed by the metal bracket and the support wall it would terminate at a position spaced from the belt.

However the strip itself is biased by its own internal distorted non-linear shape from the direction determined by the bracket and wall into contact with the belt. It is the internal shape of the strip and its elastic nature which directs the strip onto the belt and maintains contact with the belt.

The bracket comprises a metal strip which is not flat but is slightly V-shaped inverted so as to define a top apex 18E underneath the head of the bolt so that pressure from the bolt acts to press the bracket onto the top wall with the longitudinal bend line defined by the apex acting so that the edges of the bracket and particularly the rear edge 18C pinch the flexible strip 15B to the support wall.

The front edge 18D of the bracket extends beyond the front edge 15R of the strip and is turned downwardly behind the front end of the top wall 12G to form a depending flange which covers and protects the space between the top wall 12G and the flexible strip 15A.

Figure 2:
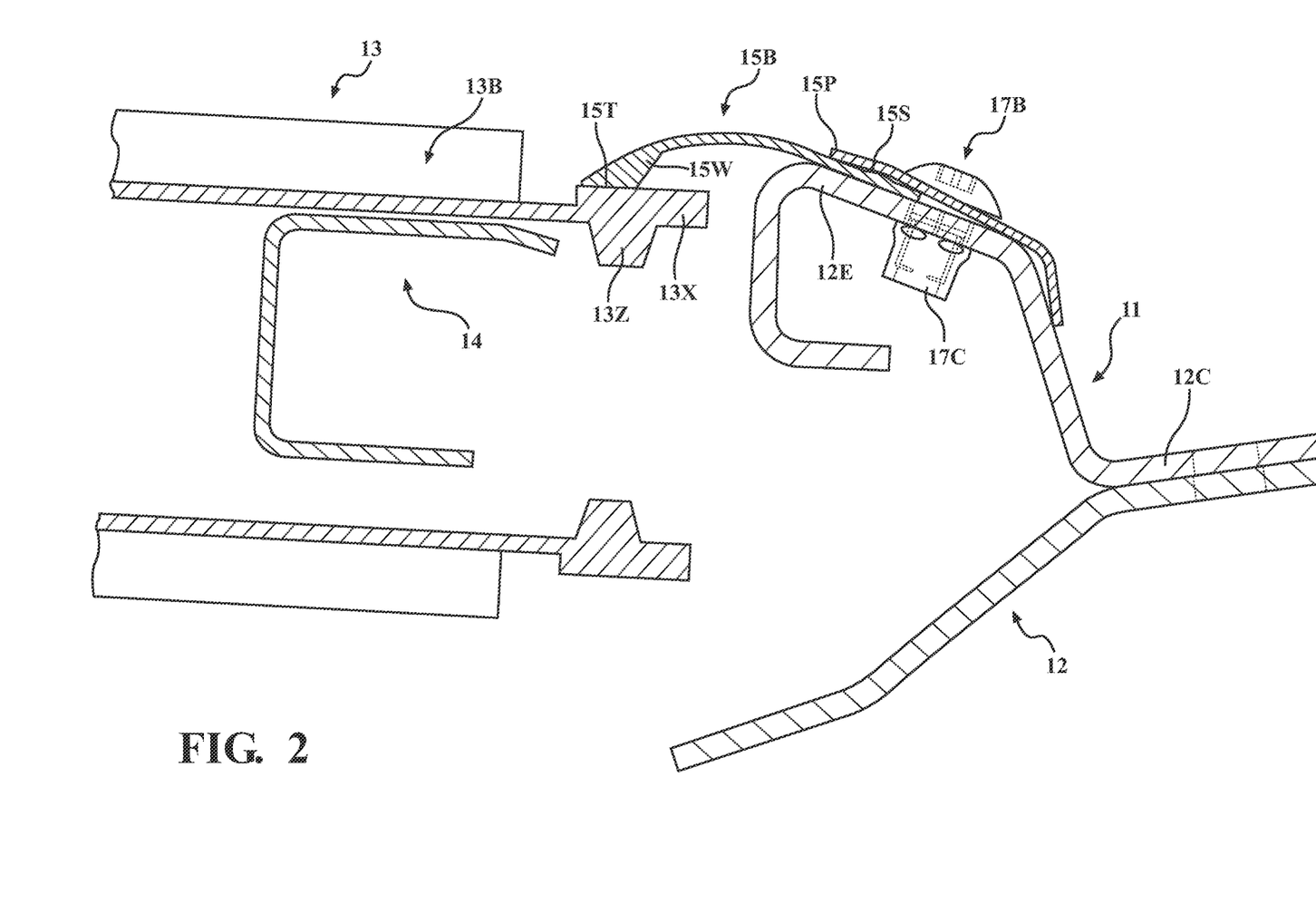
FIG. 2 is a cross sectional view showing the front part of the header and draper at the cutter bar of a second of a crop header according to the present invention using a rivnut fastening system of the strip to the cutter bar where the strip is shaped from an integral plastics material by molding or extrusion so that the thickness of the strip in cross-section is not constant.

In the second embodiment shown in FIG. 2, the strip is not bent in one bend line but instead is curved around one or more longitudinal axes generally as a smooth curve which may be part cylindrical or may have other curvatures. Also in FIG. 2, the strip is formed from a thermoplastic material which is cast or extruded so that the cross-section can be varied across the width of the strip. In a preferred arrangement, the strip is formed by simple casting of a suitable plastics material in a mold. In this case urethane can preferably be used which is typically not formable using extrusion. However other plastics materials can be used in an extrusion process. Thus the strip can be formed which can optionally have a thicker portion 15W at the second edge portion of the strip so as to define a wider flat end edge 15T which can sit on the belt in contact therewith. Thus in this embodiment the strip is formed in the distorted shape so that it maintains that shape but can be elastically flexed from its distorted condition when contacting the belt.

In this embodiment, the strip 15B is formed with a raised rib 15S just in front of the pinch point 15P so as to engage into the recess formed by the inverted V-shape of the bracket to assist in retaining the strip 15B pinched and held under the bracket onto the support wall.

In this embodiment the bolt is of the type known as a "rivnut" which is a nut 17C riveted onto the bolt 17B which provides an ensured tight clamping action between the bracket and the support wall.

Figure 3:
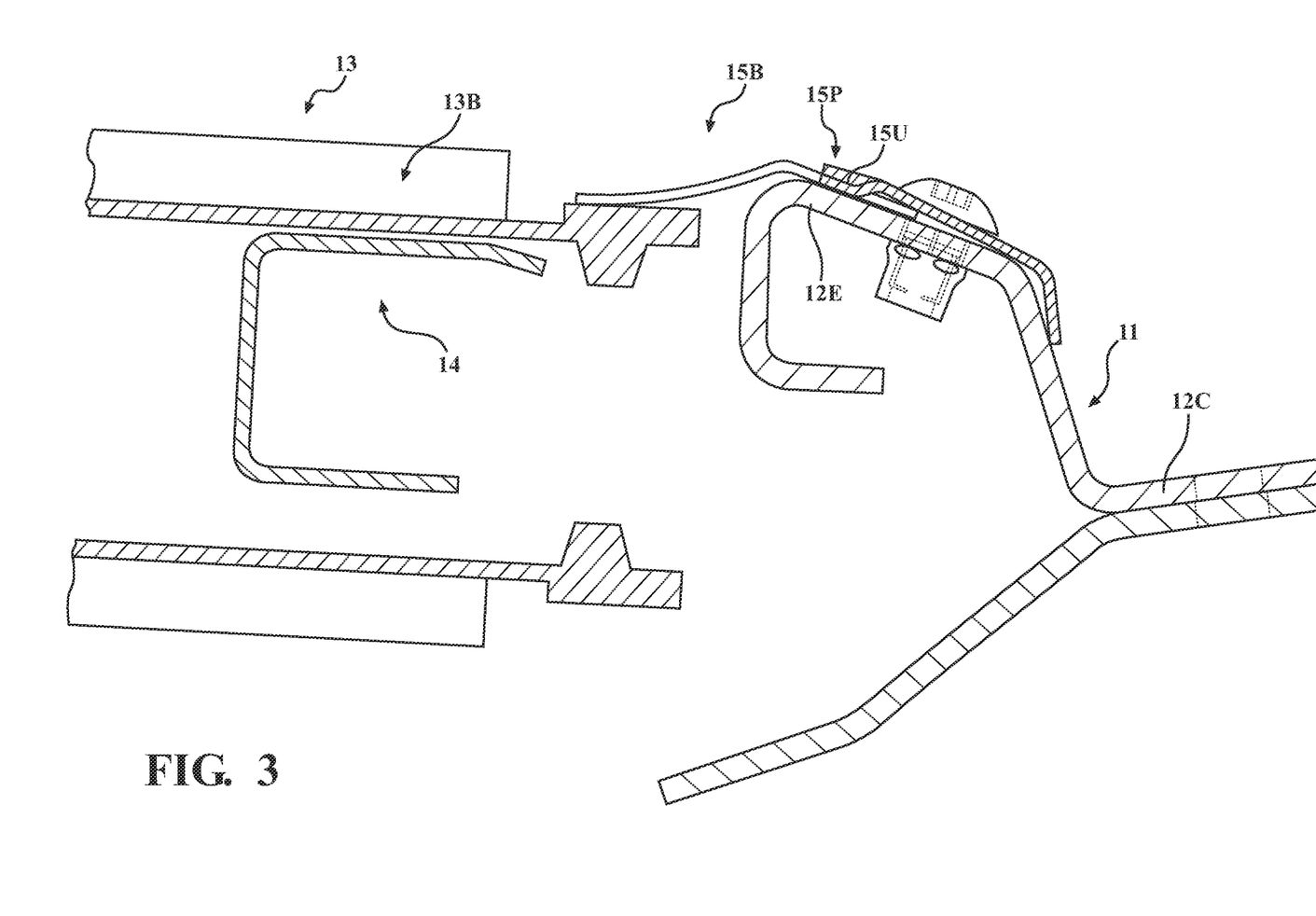
FIG. 3 is a cross sectional view showing the front part of the header and draper at the cutter bar of a third embodiment of a crop header according to the present invention using a rivnut fastening system of the strip to the cutter bar.

In FIG. 3 is shown a further embodiment which is bent as in FIG. 1. In this embodiment the strip is formed again of an upper and a lower fabric layer 20 having a vulcanized layer between.

In this embodiment the bracket 15M forms a strip or plate which is punched to define downward projections or bend portions 15U which pinch the strip 15B onto the wall 12G. It will be appreciated that the pinching of the strip 15A onto the wall 12G is particularly necessary in the spaces between the bolts where the bracket may flex a little and allow the strip to slip out unless tightly contained. However again this pinching action does not provide any biasing forces on the strip.

Figure 4:
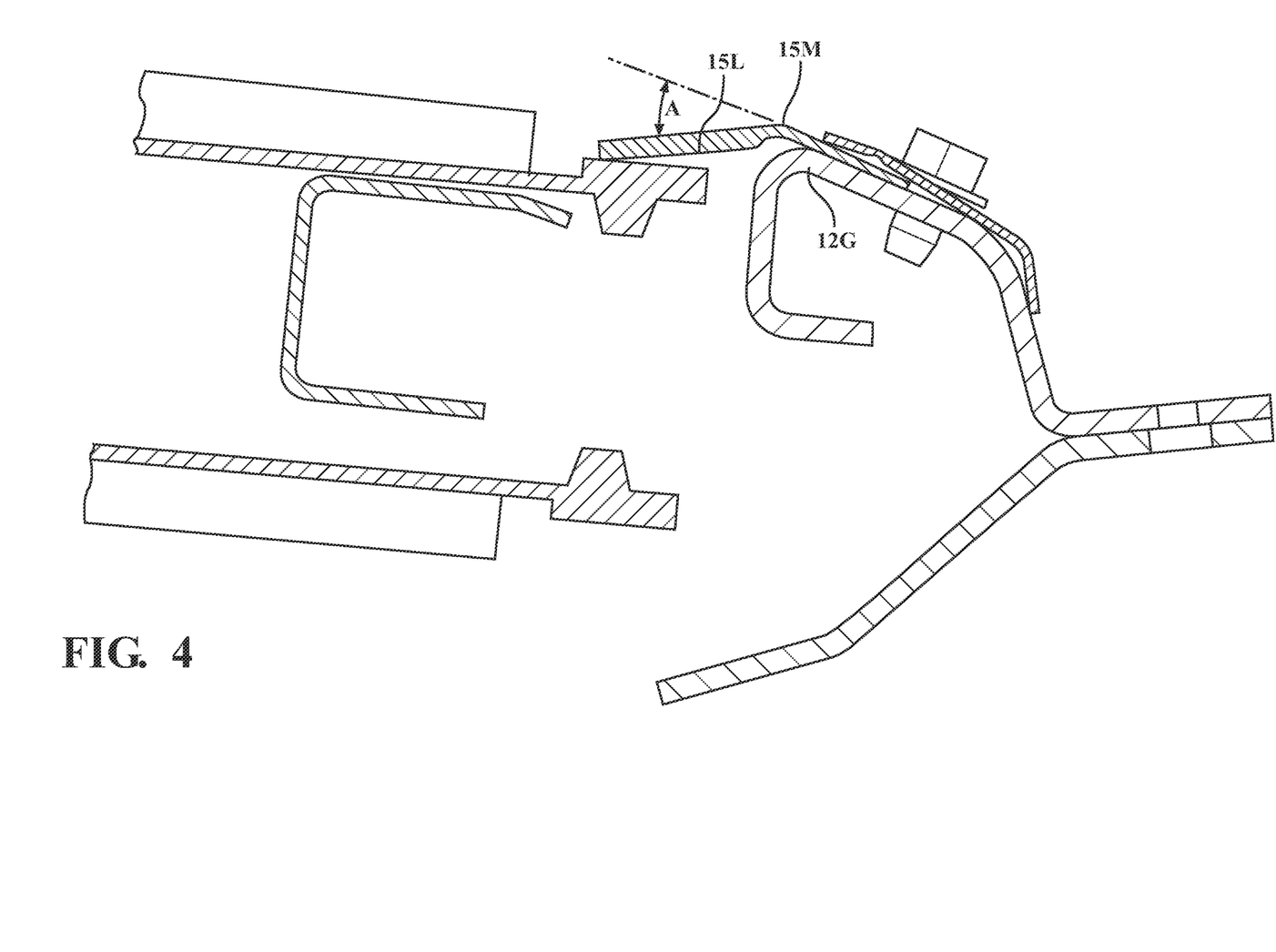
FIG. 4 is a cross sectional view showing the front part of the header and draper at the cutter bar of a fourth embodiment of a crop header according to the present invention.

In FIG. 4 is shown an extruded or cast arrangement similar to that of FIG. 2 but where the molded strip has a single bend line 15M and the use of the molding process allows there to be provided at the rear edge portion of the strip 15B a thickened layer 15L so that the thickened underside of the second edge portion runs along an upper surface of the edge strip of the belt. This can be extruded or molded or cast from any suitable material one of which is preferably urethane.

In some embodiments, the strip 1*b* Has holes to match the pattern of the bolt holes in the wall 12G. However more preferably, the strip 15B terminates just at the side edge of the bolts so that it does not extend fully underneath the bolt heads but only up to the line joining the tangents to the threaded portion of the bolt on the side adjacent the belt. This avoids the necessity to match holes in the strip 15B to the hole pattern in the wall 12G which can vary depending on the model of header. However it will appreciate that this arrangement reduces the clamping effect of the strip 18 of metal on the strip 15B against the wall 12G. This reduced clamping effect therefore requires the provision of portions of the strip 18 which pinch the strip 15B onto the wall 12G. This can be provided by an edge of the inverted V-shape of FIG. 1 or by the arrangement shown in FIG. 3 or 4 where one or both of the strip and the bracket have a punched or molded portion to interlock with the other.

The invention claimed is:

1. A crop header arranged for cutting and transporting a standing crop comprising:
    a draper assembly arranged such that cut crop falls onto the draper assembly for transportation relative to the header;
    the draper assembly including a draper guide roller and a continuous loop of belt material wrapped defining an upper run of the belt material on top of the roller and a lower run of the belt material below the roller, wherein the belt material includes a generally horizontal upper edge portion of the upper run of the belt material;
    a generally horizontal top support wall of the header adjacent to and spaced from the upper edge portion of the belt material;
    a sealing member attached to the top support wall for spanning and sealing between the upper edge portion and the top support wall;
    wherein the sealing member comprises a strip of a flexible material which extends from a first edge portion of the strip overlying the top support wall to a second edge portion of the strip which lies over and in contact with the upper edge portion of the upper run;
    a bracket extending between a front edge and an opposite rear edge facing the upper edge portion of the belt material, the rear edge engaging and clamping the first edge portion of the strip against the top support wall; and
    a fastener extending through and securing the bracket to the top support wall;
    wherein the strip, when free from loading forces, includes a convex curve between the first edge portion and the second edge portion, and wherein the strip maintains the convex curve when under loading forces.

2. The header according to claim 1 wherein the strip has a generally smooth cylindrical curve between the first edge portion and the second edge portion.

3. The header according to claim 1 wherein the strip has a constant thickness across its width.

4. The header according to claim 1 wherein the strip has a thicker portion at the second edge portion.

5. The header according to claim 1 wherein the strip includes a fabric layer and a vulcanized layer and wherein the distortion of the strip is formed in the vulcanized layer either by vulcanizing in the distorted position or by subsequent heat and pressure.

6. The header according to claim 1 wherein the strip is extruded or molded or cast from a plastics material.

7. The header according to claim 1 wherein the bracket terminates at the rear edge on the top support wall so that the bracket includes no rearward extending portion which biases the strip toward the upper run.

8. The header according to claim 1 wherein the bracket includes one or more portions which pinch the first edge portion of the strip onto the top support wall.

9. The header according to claim 8 wherein the bracket comprises a metal strip with a longitudinal bend line so that the rear edge pinches the first edge portion of the strip to the top support wall.

10. The header according to claim 9 wherein the bracket includes a plurality of fasteners securing the bracket to the support wall at spaced positions along the top support wall.

11. The header according to claim 1 wherein the first edge portion of the strip terminates at a line joining the side edge tangent of the bolts on the side facing the belt so as to avoid the necessity for matching bolt holes in the strip.

12. The header according to claim 1 wherein a front edge portion of the belt material includes a thickened layer of rubber so that an underside of the second edge portion of the strip runs along an upper surface of the thickened layer of rubber.

13. The header according to claim 1 wherein the strip includes a raised rib spaced from the first edge portion and the bracket includes a recess formed therein adjacent the rear edge mating with and engaging the raised rib to assist in retaining the strip against the top support wall.

14. The header according to claim 1 wherein the first edge portion of the strip terminates at a side edge of the bolt.

\* \* \* \* \*